United States Patent [19]

Veazey

[11] 3,933,112

[45] Jan. 20, 1976

[54] ROAD BOAT

[76] Inventor: Sidney Edwin Veazey, 1611 Crofton Parkway, Crofton, Md. 21113

[22] Filed: Nov. 21, 1973

[21] Appl. No.: 417,924

[52] U.S. Cl. .................................. 115/1 R; 9/1 R
[51] Int. Cl.² ........................................ B60F 3/00
[58] Field of Search......... 115/1 R, 1 A, .5 A; 9/1 R, 9/1 T; 114/123, 117; 296/23 B

[56] References Cited
UNITED STATES PATENTS

| | | | |
|---|---|---|---|
| 2,325,762 | 8/1943 | Ford | 9/1 T |
| 2,727,484 | 12/1955 | White | 115/1 R |
| 2,764,765 | 10/1956 | Woodruff, Sr. | 9/1 R |
| 2,822,213 | 2/1958 | Smith | 9/1 R |
| 3,134,991 | 6/1964 | Levinson | 9/1 T |
| 3,265,025 | 8/1966 | Haigh et al. | 9/1 T |
| 3,296,993 | 1/1967 | Vranian | 114/117 |
| 3,324,487 | 6/1967 | Hiett | 9/1 R |
| 3,673,622 | 7/1972 | Allen | 9/1 T |

FOREIGN PATENTS OR APPLICATIONS

| | | | |
|---|---|---|---|
| 459,042 | 8/1950 | Italy | 115/.5 A |
| 1,389,569 | 1/1964 | France | 115/1 R |

Primary Examiner—Trygve M. Blix
Assistant Examiner—Stuart M. Goldstein
Attorney, Agent, or Firm—N. J. Aquilino

[57] ABSTRACT

A conversion kit designed to convert a standard land bus vehicle into an amphibious vehicle capable of propulsion on water including a removable roof-boat, a sealing subsection to waterproof the underside of the vehicle, attachments for waterproofing the front, rear and sides of the vehicle and a water jet power means adaptable to operate through the converted vehicle's power train to propel the vehicle on water.

1 Claim, 17 Drawing Figures

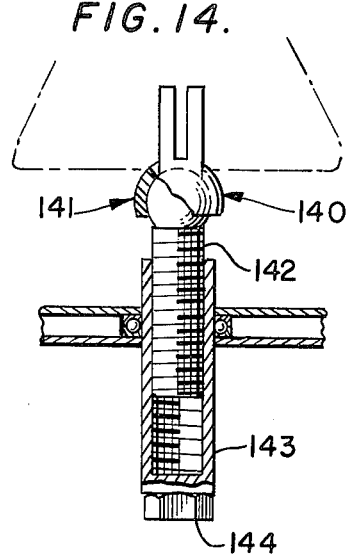
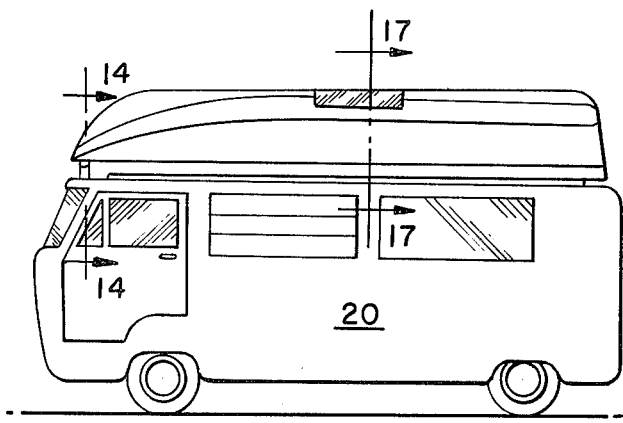
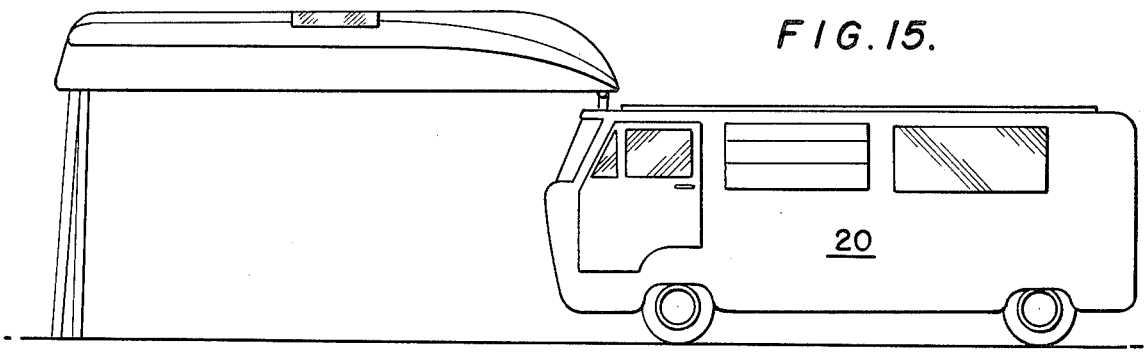
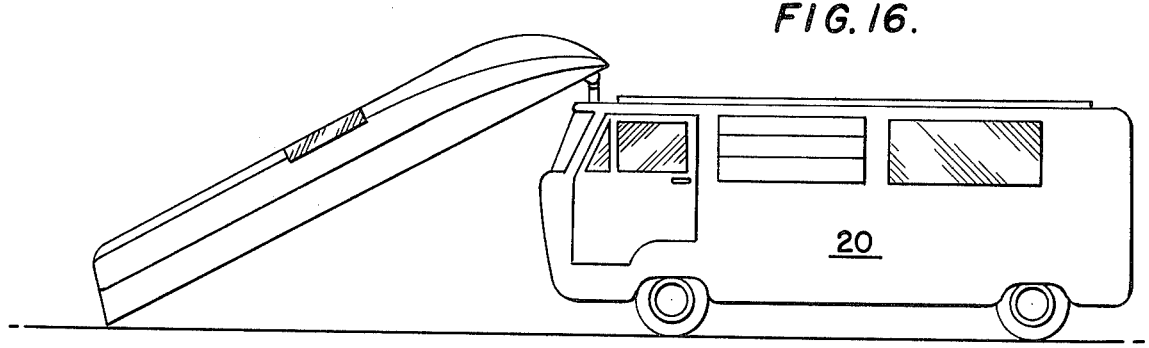
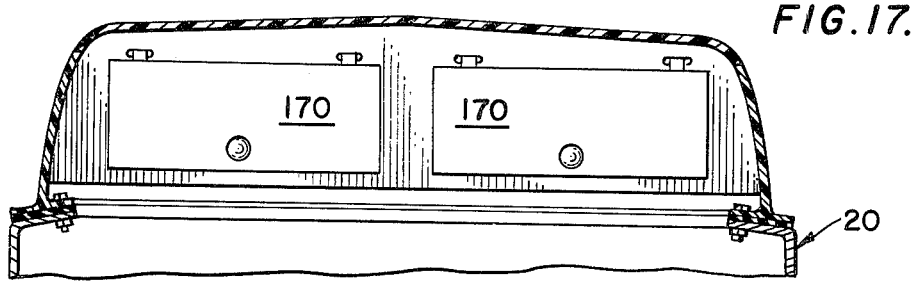

ROAD BOAT

BACKGROUND OF THE INVENTION

The present invention relates to the combination of a land and water vehicle and more particularly to a conversion kit for converting a standard mini-bus type of land vehicle into one capable of travel on water.

In recent years there has been a great interest in recreational type vehicles such as trailer campers, motor homes and various combinations thereof including pick-up trucks with attached camper bodies. In addition there has been a large upsurge in boating as a recreational passtime. Many individuals and families prefer to enjoy both land recreation, in the form of travel and camping, and water recreation in the form of boating.

By combining a water and land recreational type vehicle, an individual interested in water recreation may drive to a water recreational site and directly use his vehicle as a boat. This would provide great flexibility since the need of returning to a launch site to pick up a car and trailer is eliminated. The sailor could enter where he pleases on the lake, river or other body of water, while maintaining freedom of exit consistent with the availability of roads and/or land navigable terrain. By eliminating the need for two vehicles, one land and one aquatic, the need for transfer of persons, equipment and consumables from each no longer presents a problem since no transfer occurs. Not only does this save effort and materials of construction, but it also provides more leisure time.

An individual who primarily prefers camping, visiting national parks and other land based recreation would have the added feature of the ability to travel on water without the need for taking a boat along.

In this regard a number of combination land and water vehicles are known. By way of example, prior art land/water vehicles are shown in U.S. Pat. Nos. 3,362,373 to Mycroft, 3,421,472 to Oberg, 3,450,089 to Lippencott, 3,486,477 to Pender and 3,548,592 to Perrine. All of these patents are directed to various land/water vehicles and are distinguished from each other by structural differences including drive means and floatation features. All of these vehicles have one common feature of being a unique vehicle particularly made and designed for combined land and water use. While this is the stated purpose of such vehicles, their custom design is reflected in extremely high cost relative to the recreational budgets of most of the individuals who would be inclined to use such a vehicle.

The present invention overcomes the financial unavailability of water/land vehicles by providing a relatively inexpensive kit which can be used for conversion of existing mini-bus type vehicles into water/land vehicles.

SUMMARY OF THE INVENTION

The invention is directed to a conversion kit designed to convert a standard mini-bus type of land vehicle into an amphibious vehicle capable of travel on water or on land. The vehicle includes a removable roof-boat to further increase its versatility. The under section of the vehicle is sealed so as to become waterproof with floatation compartments. The front, rear and sides of the vehicle are provided with attachments to form a hull which permits the vehicle to float higher in water. The vehicle includes a water jet power means operable using the engine and gearing of the converted land vehicle.

Among the objects of this invention are the provision of a kit adapted to convert a conventional mini-bus type of land vehicle into an amphibious vehicle capable of travel on land and on water, the provision of a kit which renders the land vehicle watertight thereby providing a hull structure capable of floating on water without having to appreciably alter the basic design of the land vehicle, the provision of a kit wherein an amphibious vehicle is driven by means of the power train of a conventional land vehicle. Other objects and features of the present invention will become apparent from the following specification and claims.

DESCRIPTION OF THE PREFERRED EMBODIMENTS

Figure 1:
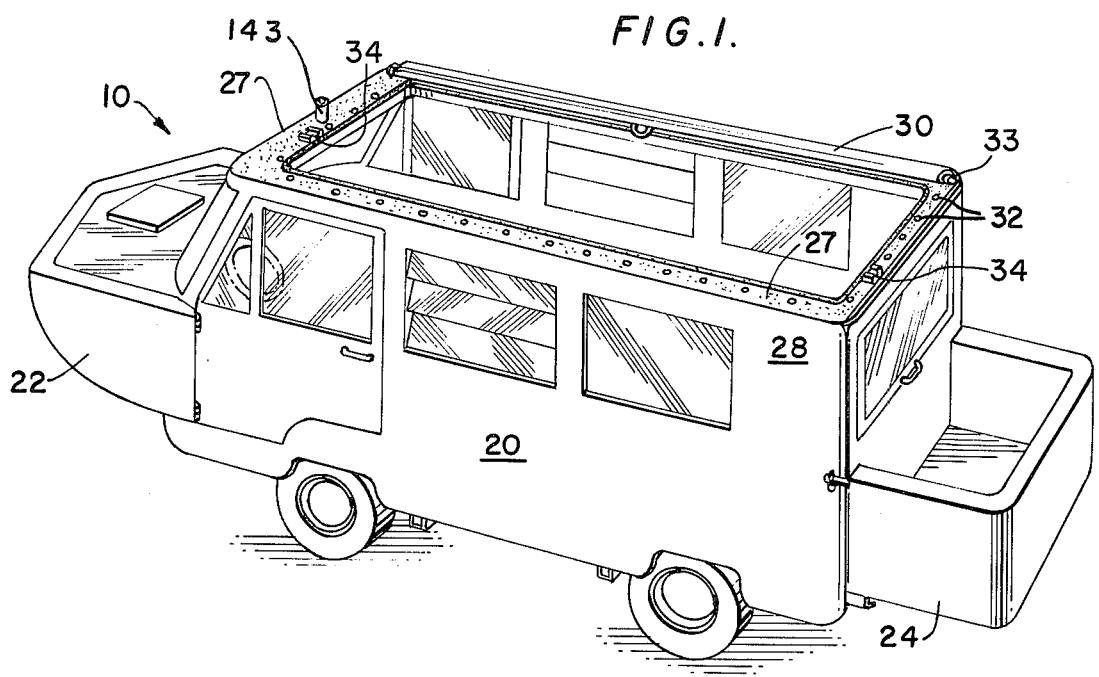

As seen in the drawings, a conventional mini-bus or van type vehicle 10 is adapted to be used as a water craft. A hull is formed by the sides 20 of the vehicle, under plates (FIG. 1) which form a water tight seal on the underside of the vehicle, a bow attachment 22, forming a bow for the vehicle and a stern attachment 24, forming a stern for the vehicle 10. The top of the vehicle is formed by means of a boat 26 which serves as the vehicle roof when it is in place by being closely fitted and attached to the upper side walls 28 of the vehicle. Seals (not shown) are placed between the boat 26 and a combing 27 on the upper side walls 28 to provide a watertight connection at this point.

Windows, doors and wheels of conventional design for van type vehicles as well as interior seating, storage and driving apparatus are included in the structure of the vehicle.

When the boat 26 is removed for use as an additional water recreational vehicle, a temporary cover 30 is shown in FIG. 1 in its rolled up position is secured across the top of the upper side walls 28 by fasteners 32 to close the vehicle. This temporary cover may also be utilized as a cot by placing the rod 33 in the holder 34.

Figure 2:
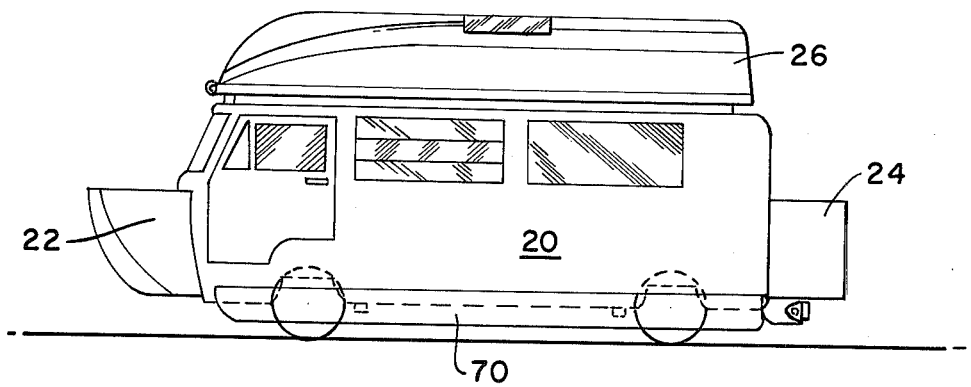
Figure 3:
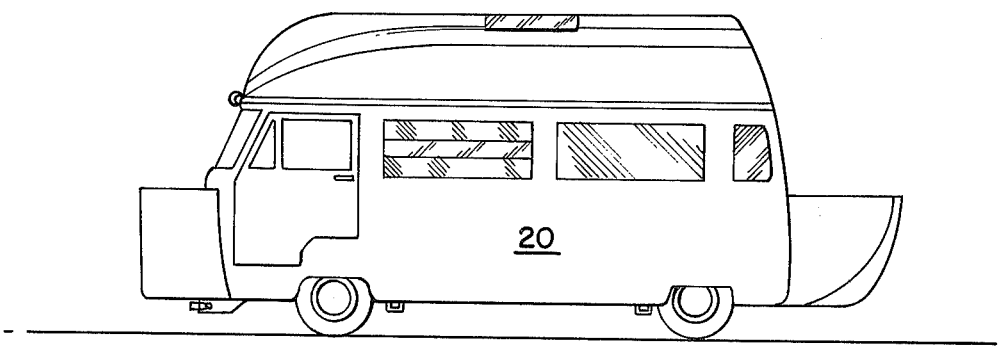

FIG. 2 illustrates the vehicle with the boat 26 in place as a roof. The bow attachment 22 is also shown attached to the front of the van while the stern attachment 24 is at the rear of the van. FIG. 3 illustrates a similar embodiment where the bow and stern attachments are reversed with respect to the van. In the later arrangement the aquatic drive train would be attached to the front of the engine rather than through the rear drive train of the van. These attachments could be removable and hence detached during the off-season for boating.

Figure 4:
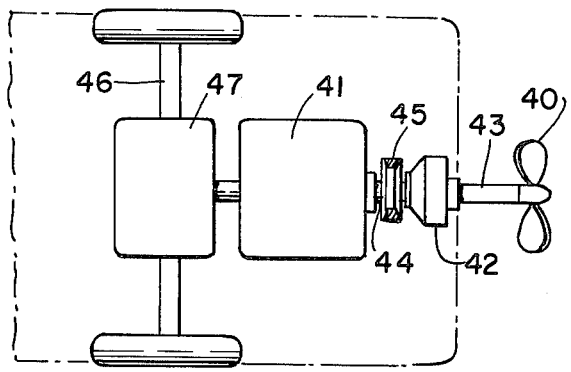

FIG. 4 illustrates a standard propeller type aquatic drive for a rear wheel engine drive including a propeller 40 attached to an engine 41 through a clutch system 42. For marine use the land transmission is in neutral and the propeller is engaged by the marine clutch. The propeller shaft 43 in an extension of the fanbelt shaft 44 which is shown with a fanbelt pulley 45. The engine 41 is connected directly to the rear wheel axle 46 through transmission system 47.

Figure 5:
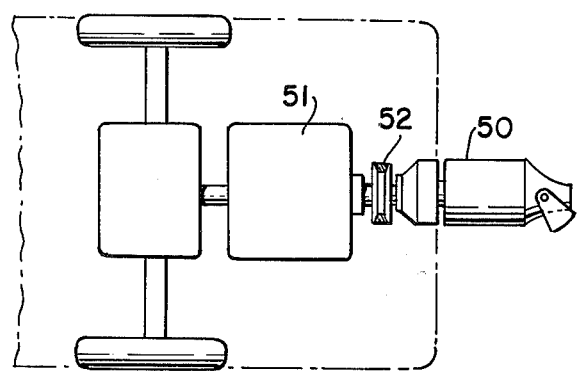

FIG. 5 illustrates a similar rear engine water jet propulsion unit including a water jet drive 50 attached to the rear engine 51 through a clutch 52 in the same manner as described with reference to FIG. 4.

Figure 6:
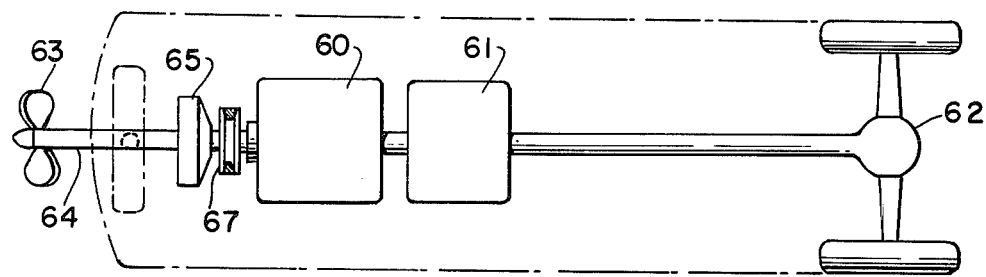

FIG. 6 shows a conventional rear wheel drive with the engine 60 in the front of the vehicle. A transmission 61 is connected to the rear wheel drive means 62. With this arrangement a propeller 63, or a water jet (not shown) is attached to the front of the vehicle, as shown in FIG. 3, to a shaft 64 coupled by a clutch 65 to the fanbelt shaft 66 also shown with a fanbelt pulley 67.

It will be appreciated that various arrangements of the marine propulsion means may be used depending upon the location of the van engine and type of marine propulsion unit used.

Figure 7:
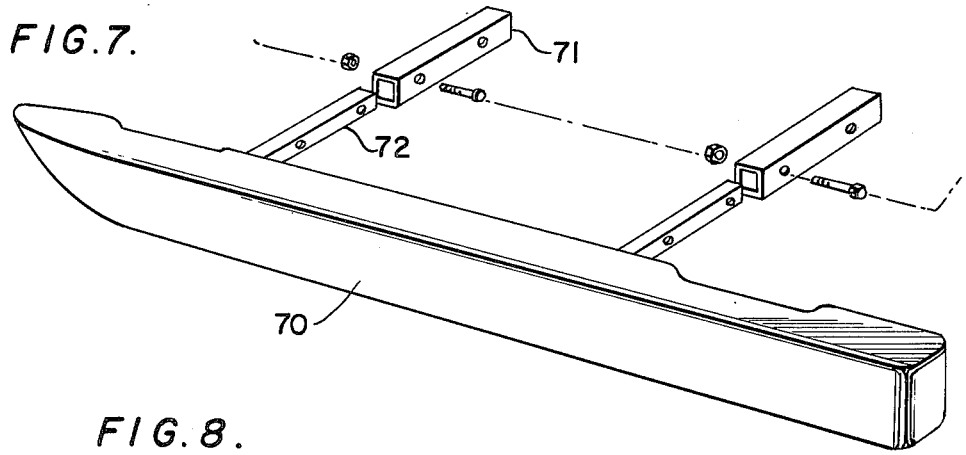
Figure 8:
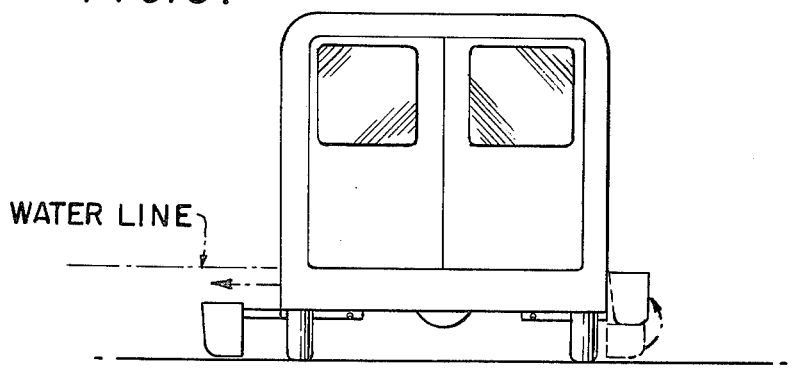

FIGS. 7 and 8 illustrate a pair of thin pontoons 70 which are designed to be extended from the vehicle 10 when it is in the water to increase stability where necessary. As can be seen from FIG. 8 the pontoons are adapted to fit close to the sides of the vehicle for land travel (road width restriction 8 feet) in an upside down position for vertical road clearance if necessary and extended from the vehicle in a normal position when the vehicle is on water. A pair of square tubular brackets 71 attached to the vehicle body with square pins 72 attached to the pontoons 70 to mount them. A nut and bolt arrangement secures the pontoons in either the stored or use position, and permits their removal during winter months.

Figure 9:
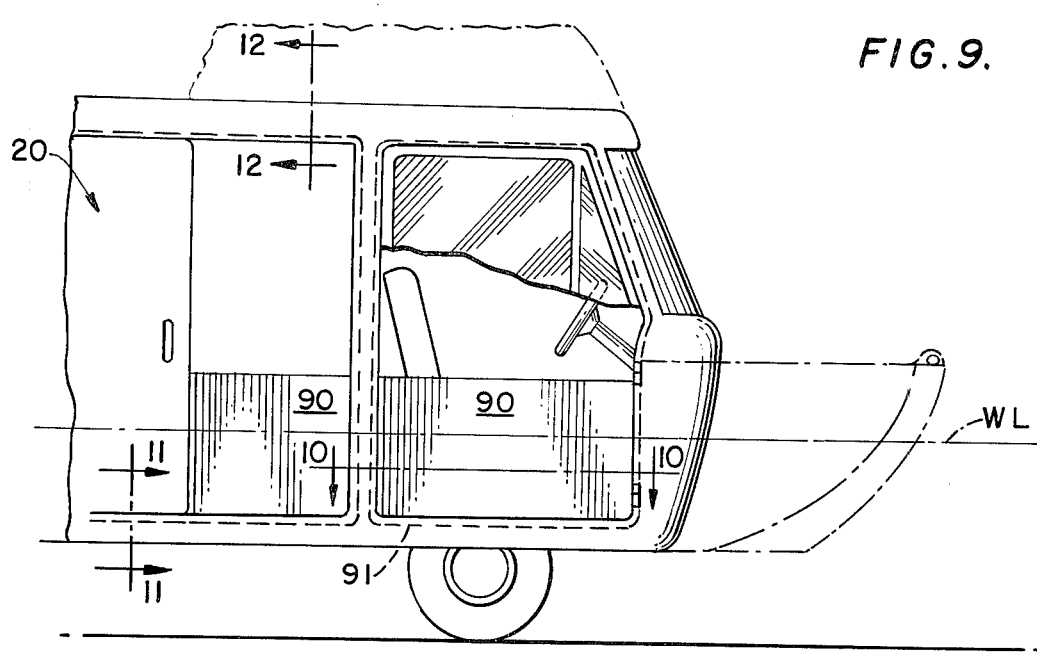

FIG. 9 shows a side view of a converted van wherein structural plates 90 are permanently welded to the inside of the door openings to provide a water-tight surface below the water line. With these elements in place, the lower portion of the door frame 91 serves as steps in order to enter into the vehicle over the plates 90.

Figure 10:
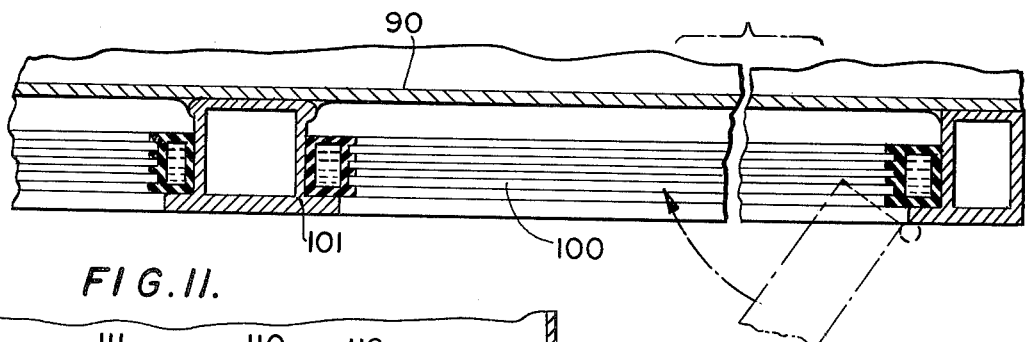

FIG. 10 illustrates an additional seal at this point in the form of an elongated seal 100 placed around the periphery of the lower door frame 101. The seal 100 is preferably made of resilient material into a generally tubular cross-section in order to hold an incompressible fluid which enables the seal to seat itself in the most efficient position. The seal may also have the ridges oriented such that the side of the door instead of the edge contacts the seal.

Figure 11:
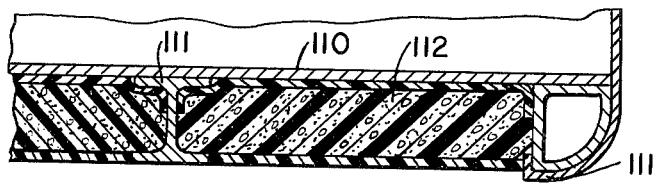

FIG. 11 illustrates the underside of the vehicle 10 which includes fiberglass, steel, or aluminum plates 110 welded to the underside of the members of the vehicle frame 111, to provide a water-tight seal at that point. Foamed plastic 112 is also provided at the underside of the vehicle to provide positive flotation inside this double bottom. A preservative would be applied to the body and parts requiring protection.

Figure 12:
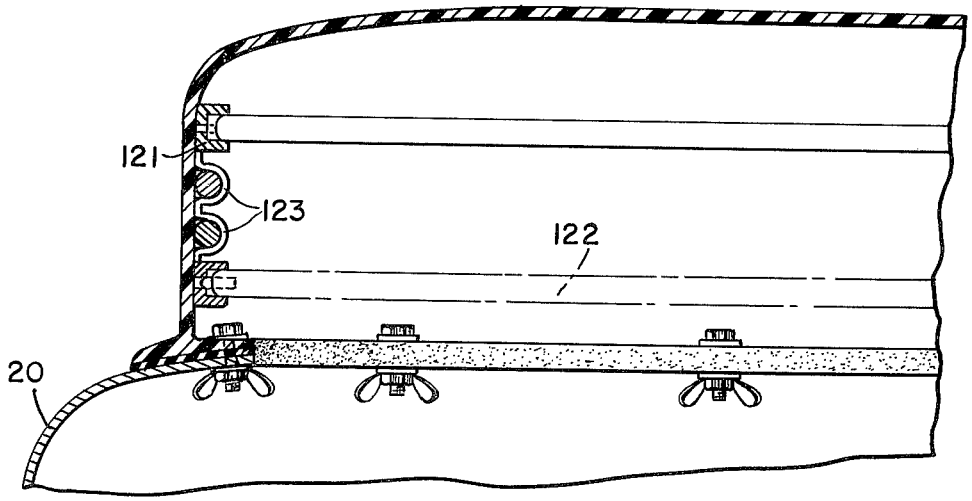

FIG. 12 illustrates a sectional view of the boat 26. Preferably bolts 120 are provided to secure the boat to the top of the vehicle. Brackets 121 are provided to mount the boat seats 122. Two brackets 121 are provided, one at the bottom of the boat and the second at the top. This arrangement permits storage of the seats at a higher point when the boat is upside down and forms a roof for the vehicle to provide more head room within the vehicle itself. Mounting loops 123 are provided to store the oars and mast sections when the boat is not in use.

FIG. 17 shows a further sectional view of the boat which includes storage cabinets 170 formed as an integral part of the boat design for use in either the boat when it is used separately from the vehicle as a boat or on the vehicle as its roof.

FIGS. 13 through 16 illustrate the various positions the boat may assume relative to the vehicle. The vehicle shown is a conventional van type and it will be appreciated the boat top design is equally applicable to such vehicles, travel trailers, and tent campers, as well as the above described water-land vehicle. FIG. 13 shows the boat in place, FIG. 15 shows the boat used as a temporary shelter using the oars or mast sections as supports, and FIG. 16 shows the boat as it could be removed from atop the vehicle by one person.

FIG. 14 illustrates a ball and socket device used to dismount the boat from atop the vehicle. A socket 140 is provided on the boat which engages a ball 141 attached to a threaded bolt 142 which in turn is threaded into a correspondingly threaded cylinder 143 secured to the vehicle. The end of the cylinder 143 forms a nut 144 which when turned causes the threaded bolt 142 to be raised. This correspondingly raises the end of the boat and permits it to be lifted and pivoted about the ball and socket joint until it is free of the vehicle where it may be conveniently lowered to the ground.

I claim:

1. A vehicle adapted for use on dry land or in water comprising a van type vehicle comprising a body; drive means; sealing means attached to the lower sections of said body forming a bow and stern structure and maintaining said vehicle watertight; flotation means attached to said body and a roof structure including a boat which conforms to the upper section of said body providing a seal therebetween, said roof structure further including means for securing said boat to the body of said vehicle and dismounting means for removal of said boat from said vehicle wherein said dismounting means includes a ball and socket respectively attached to said boat and said vehicle; a threaded bolt attached to said ball; a threaded cylinder adapted to receive said threaded bolt, said threaded cylinder including a nut at its closed end, actuation of which lowers and raises said threaded bolt and ball attached thereto.

* * * * *